United States Patent
Seo et al.

(10) Patent No.: US 10,789,160 B2
(45) Date of Patent: Sep. 29, 2020

(54) UTILIZING DIFFERENT DATA STORAGE POLICIES IN RESPONSE TO DIFFERENT CHARACTERISTICS OF DATA

(71) Applicant: SAMSUNG ELECTRONICS CO., LTD., Suwon-si, Gyeonggi-do (KR)

(72) Inventors: Sung Yong Seo, Seongnam-si (KR); Kyung Ho Kim, Seoul (KR); Seung Uk Shin, Seoul (KR); Yeong Jae Woo, Suwon-si (KR); Hyun Ju Kim, Hwaseong-si (KR); Jeong Hoon Cho, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/446,352

(22) Filed: Jul. 30, 2014

(65) Prior Publication Data
US 2015/0046636 A1    Feb. 12, 2015

(30) Foreign Application Priority Data

Aug. 8, 2013    (KR) .......................... 10-2013-0094390

(51) Int. Cl.
  *G06F 12/02*    (2006.01)
  *G06F 12/08*    (2016.01)
  *G06F 12/10*    (2016.01)

(52) U.S. Cl.
  CPC .......... *G06F 12/0246* (2013.01); *G06F 12/08* (2013.01); *G06F 12/10* (2013.01); *G06F 2212/7201* (2013.01)

(58) Field of Classification Search
  CPC ......... G06F 12/0246; G06F 2212/7201; G06F 12/10; G06F 12/08
  See application file for complete search history.

(56) References Cited

U.S. PATENT DOCUMENTS 5,860,083 A * 1/1999 Sukegawa ............... G06F 12/08
                                                        711/103
6,292,874 B1   9/2001 Barnett
(Continued)

FOREIGN PATENT DOCUMENTS

CN    101246738 A    8/2008
CN    101271383 A    9/2008
(Continued)

OTHER PUBLICATIONS

Pinder, Steve; Adshead, Antony. "Thin provisioning: How it works and its benefits for storage capacity management". Sep. 2010. Computerweekly.com. Retrieved from https://www.computerweekly.com/feature/Thin-provisioning-How-it-works-and-its-benefits-for-storage-capacity-management. (Year: 2010).*

*Primary Examiner* — Hashem Farrokh
(74) *Attorney, Agent, or Firm* — Volentine, Whitt & Francos, PLLC

(57) ABSTRACT

A method of operating a storage device which includes a non-volatile memory including a normal unit configured to store normal data and a swap unit configured to store swap data and a controller configured to control the non-volatile memory is provided. The method includes receiving the swap data and a unit selection signal for selecting the swap unit from a host; and processing the swap data according to a data processing policy of the swap unit and writing the processed swap data to the swap unit. The data processing policy of the swap unit may be different from a data processing policy of the normal unit.

19 Claims, 26 Drawing Sheets

(56) References Cited

U.S. PATENT DOCUMENTS

| | | |
|---|---|---|
| 6,718,436 B2 | 4/2004 | Kim et al. |
| 6,725,328 B2 | 4/2004 | Kano et al. |
| 7,577,854 B2 | 8/2009 | Tanabiki et al. |
| 7,596,637 B2 | 9/2009 | Nonaka et al. |
| 7,617,371 B2 | 11/2009 | Fujimoto et al. |
| 7,853,772 B2 | 12/2010 | Chang et al. |
| 8,037,244 B2 | 10/2011 | Muto et al. |
| 8,135,899 B1 | 3/2012 | Dobrovolskiy et al. |
| 8,271,745 B2 * | 9/2012 | Ware ................... G06F 12/0292 711/103 |
| 2004/0019760 A1 | 1/2004 | Lin et al. |
| 2006/0294304 A1 | 12/2006 | Brown et al. |
| 2008/0162789 A1 * | 7/2008 | Choi ................... G11C 11/5628 711/103 |
| 2008/0195833 A1 | 8/2008 | Park |
| 2009/0006720 A1 * | 1/2009 | Traister ............... G06F 12/0246 711/103 |
| 2010/0241786 A1 * | 9/2010 | Singh .................. G06F 12/0246 711/103 |
| 2010/0268907 A1 * | 10/2010 | Ouren ................... G06F 9/5077 711/170 |
| 2012/0030404 A1 | 2/2012 | Yamamoto et al. |
| 2012/0054465 A1 | 3/2012 | Post et al. |
| 2012/0151127 A1 * | 6/2012 | Lim .................... G06F 12/0246 711/103 |
| 2012/0284587 A1 * | 11/2012 | Yu ........................ G06F 3/0608 714/773 |
| 2013/0159662 A1 | 6/2013 | Iyigun et al. |

FOREIGN PATENT DOCUMENTS

| | | |
|---|---|---|
| JP | 2003-015915 A | 1/2003 |
| JP | 2009-020776 | 1/2009 |
| JP | 2009-282603 | 12/2009 |
| KR | 1020120066198 A | 6/2012 |
| KR | 1020120082218 A | 7/2012 |

* cited by examiner

FIG. 3A

| VA | PA or LBA |
|---|---|
| VA0 | DRAM PA |
| VA1 | LBA1 |
| VA2 | LBA2 |

FIG. 3B

| LBA2 | NAND PA |
|---|---|
| 0 | × |
| 1 | (0,1) |
| 2 | × |
| 3 | (0,2) |
| 4 | × |
| 5 | (1,1) |
| 6 | × |
| 7 | × |

Address Space

Effective Capacity

FIG. 7

| Addressing Mode | Description |
|---|---|
| Default | Use 512-Byte Sector |
| Big Sector | Use Big Sector (4KB, 8KB,...) |
| Block & Page | Use NAND Block or Page |
| Block | Use NAND Block |
| Byte | Use Byte |

FIG. 14

|     | VA  | PA      |
|-----|-----|---------|
| VA0 | 1 ⋮ 100 | DRAM PA |
| VA1 | 101 ⋮ 200 | LBA1    |
| VA2 | 201 | (0,1)   |
|     | 202 | (0,3)   |
|     | 203 | (3,1)   |
|     | 204 | (2,3)   |
|     | 205 | (3,3)   |
|     | 206 | (1,2)   |

FIG. 15

|  | Block 0 | Block 1 | Block 2 | Block 3 |
|---|---|---|---|---|
| Page 0 | × | × | × | × |
| Page 1 | ○ | × | × | ○ |
| Page 2 | × | ○ | × | × |
| Page 3 | ○ | × | ○ | ○ |

FIG. 17

| | LBA2 | Valid |
|---|---|---|
| Block 1 | 1 | × |
| | 2 | ○ |
| | ⋮ | ⋮ |
| | 25 | × |
| Block 2 | 26 | × |
| | ⋮ | ⋮ |
| | 50 | ○ |
| Block 3 | 51 | ○ |
| | ⋮ | ⋮ |
| | 75 | × |
| Block 4 | 76 | × |
| | ⋮ | ⋮ |
| | 100 | × |

UTILIZING DIFFERENT DATA STORAGE POLICIES IN RESPONSE TO DIFFERENT CHARACTERISTICS OF DATA

CROSS-REFERENCE TO RELATED APPLICATIONS

This application claims priority under 35 U.S.C. § 119(a) from Korean Patent Application No. 10-2013-0094390 filed on Aug. 8, 2013, the disclosure of which is hereby incorporated by reference in its entirety.

BACKGROUND

Embodiments of the inventive concept relate to storage devices, computer systems including storage device(s), and related methods of operation.

Certain computer systems include a host, a main memory, and an auxiliary storage units. Variously embodied auxiliary storage units (hereinafter, generally referred to as "storage device") are external memory devices that provide additional data storage capacity to the computer system beyond that provided by the main memory. In certain applications, contemporary computer systems may write "normal data" associated with a normal write (or program) operation, and/or "swap data" associated with one or more operations other than the normal write operation to the storage device. As will be appreciated by those skilled in the art, swap data is usually valid for only a single power cycle, and becomes invalid once it is read from the storage device.

SUMMARY

Certain embodiments of the inventive concept provide storage devices capable of using different data processing policies in relation to one or more characteristics of data being stored during operation of a computer system. Other embodiments of the inventive concept provide methods of operating a storage device that allow different data processing policies to be used in relation to one or more characteristics of data being stored during operation of a computer system.

BRIEF DESCRIPTION OF THE DRAWINGS

The above and other features and advantages of the inventive concept will become more apparent by describing in detail exemplary embodiments thereof with reference to the attached drawings in which:

FIG. 3A is a page mapping table stored in a memory management unit illustrated in FIG. 1;

FIG. 3B is a logical address to physical address (L2P) table stored in a controller illustrated in FIG. 1;

FIG. 7 is a table showing addressing modes and units of data output of a data processor;

FIG. 10, inclusive of FIGS. 10A, 10B and 10C, is a diagram illustrating the generation and change of a storage unit according to certain embodiments of the inventive concept;

FIG. 14 is a page mapping table in a host according to some embodiments of the inventive concept;

FIG. 15 is a diagram showing the validity of each page based on the page mapping table illustrated in FIG. 14;

FIG. 17 is a validity table stored in the host during the block mapping illustrated in FIG. 16;

DETAILED DESCRIPTION OF EMBODIMENTS

The inventive concept now will be described more fully hereinafter with reference to the accompanying drawings that illustrate embodiments of the inventive concept. The inventive concept may, however, be embodied in many different forms and should not be construed as being limited to only the illustrated embodiments. Rather, these embodiments are provided so that this disclosure will be thorough and complete, and will fully convey the scope of the inventive concept to those skilled in the art. Throughout the written description and drawings like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
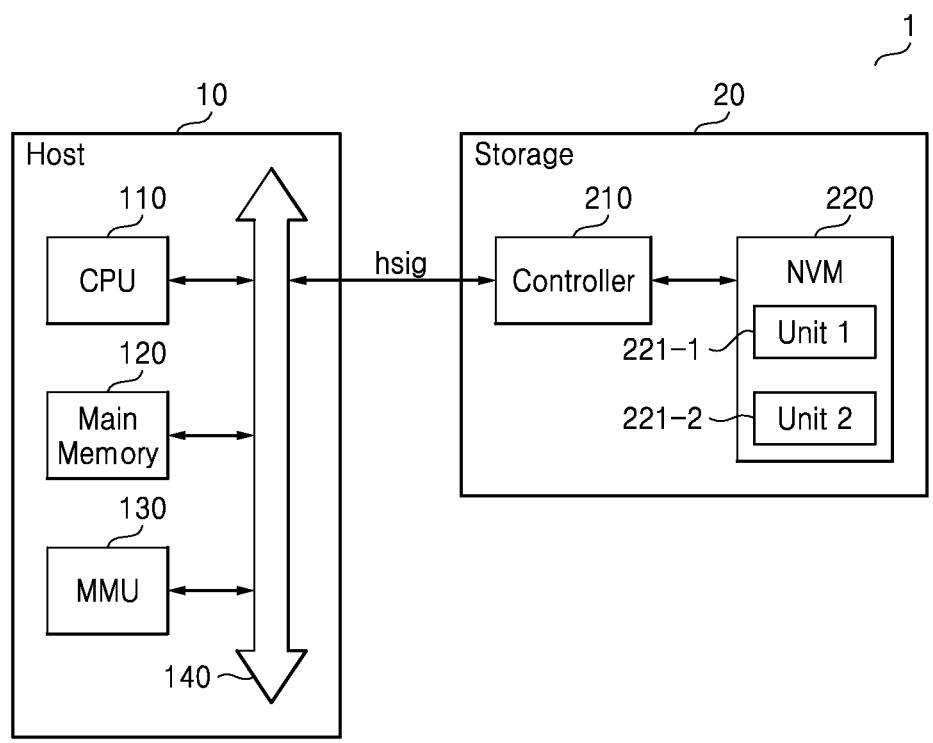
FIG. 1 is a block diagram of a computer system according to some embodiments of the inventive concept.

FIG. 1 is a block diagram of a computer system 1 according certain embodiments of the inventive concept. The computer system 1 may be implemented as a handheld device such as a mobile telephone, a smart phone, a tablet computer, a personal digital assistant (PDA), an enterprise digital assistant (EDA), a digital still camera, a digital video camera, a portable multimedia player (PMP), a personal navigation device or portable navigation device (PND), a handheld game console, or an e-book. In other embodiments, the computer system 1 may be implemented as a personal computer (PC) or a data server. The computer system 1 may include a host 10 and a storage device 20.

The host 10 includes a central processing unit (CPU) 110, a main memory 120, a memory management unit (MMU) 130, and a bus 140. The CPU 110, which may be referred to as a processor, may process or execute programs and/or data stored in the main memory 120. For instance, the CPU 110 may process or execute the programs and/or the data in response to a clock signal output from a clock signal generator (not shown).

The CPU 110 may be implemented by a multi-core processor. The multi-core processor is a single computing component with two or more independent actual processors (referred to as cores). Each of the processors may read and execute program instructions. The multi-core processor can drive a plurality of accelerators at a time, and therefore, a data processing system including the multi-core processor may perform multi-acceleration.

The CPU 110 may be connected with the main memory 120 through the bus 140 including an address bus, a control bus, and/or a data bus. The main memory 120 may include dynamic random access memory (DRAM). In other embodiments, the main memory 120 may include static RAM (SRAM), flash memory, phase-change RAM (PRAM), ferroelectric RAM (FeRAM), resistive RAM (RRAM), or magnetic RAM (MRAM).

When there is no unused space in the main memory 120, the CPU 110 may perform a swap operation when loading a new page to the main memory 120. The swap operation is an operation of storing at least one of the pages loaded to the main memory 120 in the storage device 20 as swap data in order to secure storage space for the new page.

The MMU 130 may be a computer hardware component that manages the access of the CPU 110 to the main memory 120 and the storage device 20. The MMU 130 may perform memory address translation, memory protection, cache management, and bus arbitration. In other embodiments, the MMU 130 may perform bank switching.

The storage device 20 may be implemented as a solid-state drive (SSD), an embedded multi-media card (eMMC), or a universal flash system (UFS). The storage device 20 includes a controller 210 and a non-volatile memory (NVM) 220.

The controller 210 may receive a host signal (hsig) from the host 10 and may control the operation of the NVM 220 in response to the host signal (hsig).

The NVM 220 may be used to store data provided from the host 10 in a nonvolatile manner. That is, stored data is validly retained in the NVM 220 even when applied power is interrupted. Thus, the NVM 220 may include one or more types of nonvolatile memory such as NAND flash memory, NOR flash memory, PRAM, FRAM, RRAM, or MRAM. The NVM 220 may include a plurality of storage units, e.g., a first unit 221-1 and a second unit 221-2. The controller 210 may control normal data to be stored in the first unit 221-1 and swap data to be stored in the second unit 221-2.

The first unit 221-1 has a first address space and a first effective capacity and the second unit 221-2 has a second address space and a second effective capacity. Even when the first and second effective capacities are changed at the request of the host 10, the first and second address spaces may be maintained without being changed. Also, even when the effective capacity of an existing unit is changed at the request of the host 10 to generate a new unit, the address space of the existing unit may be maintained without being changed.

Meanwhile, at the request of the host 10, for example, according to an address space change signal, the controller 210 may change the first or second address space while maintaining the first and second effective capacities. In other words, address space and effective capacity may be changed independently from each other. For instance, the first effective capacity and the first address space may be changed independently from each other and the second effective capacity and the second address space may be changed independently from each other.

While it is difficult to dynamically change a conventional partition, management of a unit, such as dynamic generation, change, and erasure of a unit, becomes easy according to embodiments of the inventive concept, since the address space and the effective capacity of the unit may be managed independent of one another. This will be described hereafter in some additional detail.

Figure 2A:
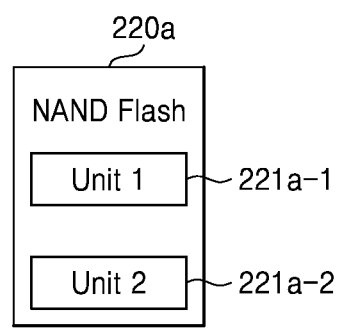
FIGS. 2A and 2B are diagrams of examples of a non-volatile memory (NVM) illustrated in FIG. 1.
Figure 2B:
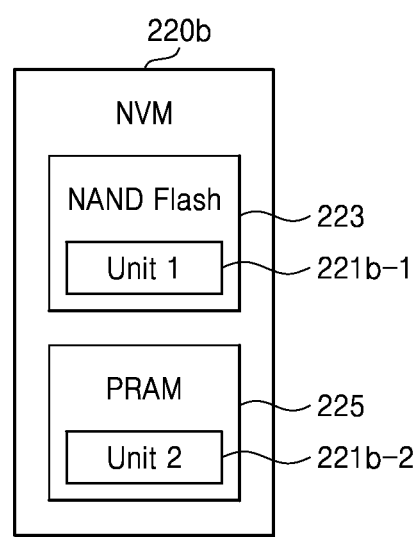

FIGS. 2A and 2B are diagrams of examples 220a and 220b of the NVM 220 illustrated in FIG. 1. Referring to FIG. 2A, the NVM 220a may be implemented as NAND flash memory. The NVM 220a may include a plurality of storage units, e.g., a first unit 221a-1 and a second unit 221a-2.

Referring to FIG. 2B, the NVM 220b may include a NAND flash memory 223 and a PRAM 225. The NAND flash memory 223 may include at least one storage unit, e.g., a first unit 221b-1. The PRAM 225 may include at least one storage unit, e.g., a second unit 221b-2.

The host 10 communicates a write/read command in relation to given sector units to the storage device 20. However, since the PRAM 225 processes data in byte units, sector-to-unit access may lead to unnecessary expenditure of computer system computational time and related resources. Thus, in accordance with embodiments of the inventive concept, different address modes may be provided for each unit, such that the storage device 20 may be more efficiently operated.

FIG. 3A is a page mapping table stored in MMU 130 illustrated in FIG. 1. FIG. 3B is a logical address-to-physical address (L2P) table stored in the controller 210 illustrated in FIG. 1.

Referring to FIGS. 1 and 3A, the page mapping table may be used to map a virtual address (VA) processed by the CPU 110 to a physical address (PA) of the main memory 120, e.g., DRAM, or a logical block address (LBA) of the storage device 20. That is, the page mapping table may map a first VA group VA0 to the PA of the main memory 120, a second VA group VA1 corresponding to the first unit 221-1 to a first LBA LBA1, and a third VA group VA2 corresponding to the second unit 221-2 to a second LBA LBA2.

Referring now to FIGS. 1 and 3B, the controller 210 may be used to store an L2P table for each unit. The L2P table will map an LBA received from the host 10 to a PA of the NVM 220. For purposes of this description, it will be assumed that the second LBA LBA2 corresponding to the second unit 221-2 has address space values that range from 0 to 7.

The address space is memory space for the LBA that is managed by the controller 210 for each unit. For instance, the address space of the second unit 221-2 may be designated as having a value of 8. The "effective capacity" is a maximum space in which a PA of the NVM 220 may be mapped to an LBA within the address space of a unit.

The "residual capacity" is the effective capacity minus the "used capacity" for each unit, and represents the capacity to which additional mapping operations may be directed. For instance, when three LBAs 1, 3, and 5 are mapped in the second unit 221-2 and the effective capacity is 5, two (2) more LBAs among LBAs 0, 2, 4, 6, and 7 that have not been mapped may be mapped. Thus, in this simple example, the residual capacity is 2.

Figure 4A:
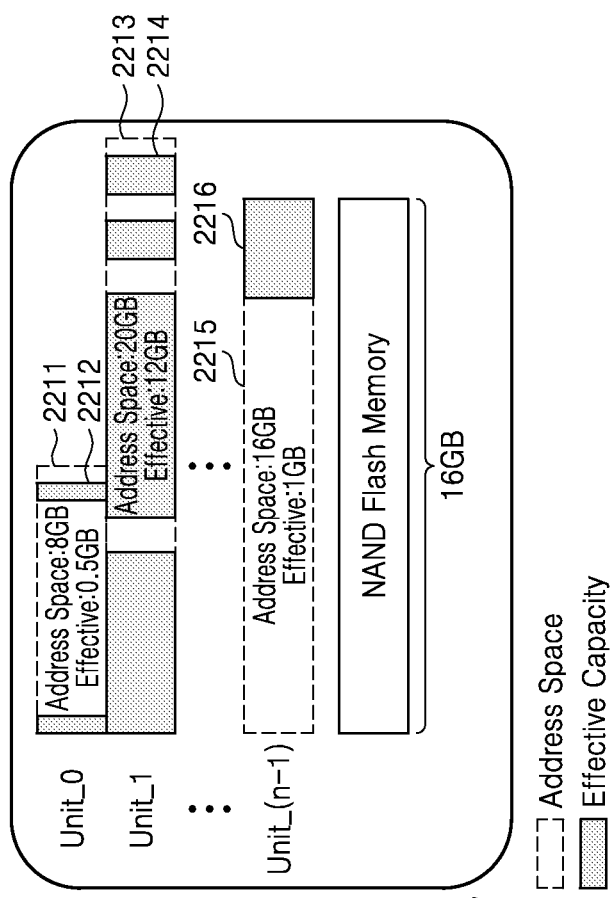
FIG. 4A is a diagram of a partition structure as a comparison example of the inventive concept.
Figure 4B:
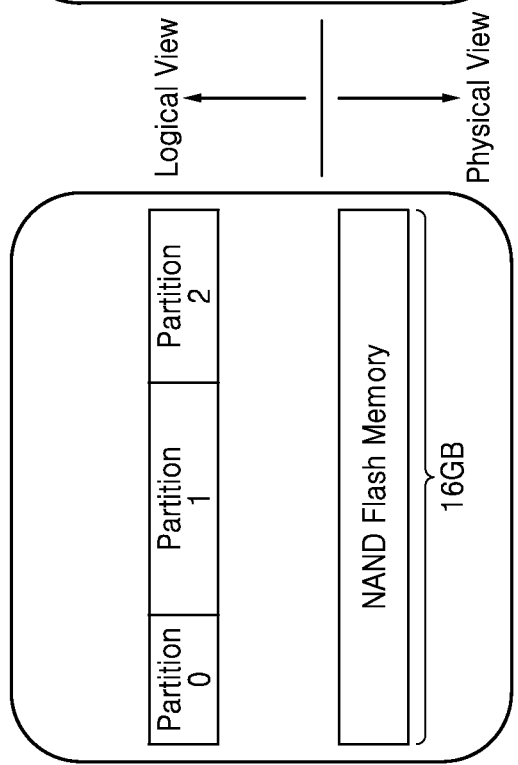
FIG. 4B is a diagram of address space and effective capacity in each unit according to some embodiments of the inventive concept.

FIG. 4A is a diagram of a partition structure that serves as a comparative example for certain embodiments of the inventive concept, whereas FIG. 4B is a diagram of the address space and effective capacity in each unit according to an illustrated embodiment of the inventive concept.

Referring collectively to FIGS. 1, 3, 4A, and 4B, it is assumed that the NVM 220 is a NAND flash memory having a capacity of 16 GB. When the NAND flash memory 220 is partitioned, the problem of hard dynamic changes arises. For instance, when the NAND flash memory 220 is initially partitioned into 15 GB and 1 GB segments, and thereafter the 1 GB segments are extended to 2 GB segments, it would be conventionally necessary to create a new file system, and therefore, the data stored in a storage device according to the initial partitions would need to the backed up, erased, and rewritten.

Accordingly to certain embodiments of the inventive concept, however, a "virtual address space" unrelated to the actual capacity ascribed to the initial 16 GB partitioning may be provided for each storage unit. For instance, the NAND flash memory 220 may be divided into first through n-th units (e.g., Unit_0 through Unit_(n−1)), where "n" is an integer greater than 1). The first unit Unit_0 may be set to have an address space 2211 of 8 GB and an effective capacity 2212 of 0.5 GB. The second unit Unit_1 may be set to have an address space 2213 of 20 GB and an effective capacity 2214 of 12 GB. The n-th unit Unit_(n−1) may be set to have an address space 2215 of 16 GB and an effective capacity 2216 of 1 GB.

The L2P table is set to include mapping information corresponding to an address space larger than an effective capacity, so that an address space of each unit can be set larger than the effective capacity. As a result, even when the capacity of each storage unit is changed (e.g., repartitioned), the address space may be used consistently thereby enabling a relatively easy dynamic change in address space definition.

Meanwhile, a total of effective capacity is set less than an actual capacity of the NVM 220 and a residual capacity is used as an over-provisioning region area, so that the requirement for execution of a garbage collection operation may be delayed. As a result, the performance of the storage device 20 is improved.

Figure 5:
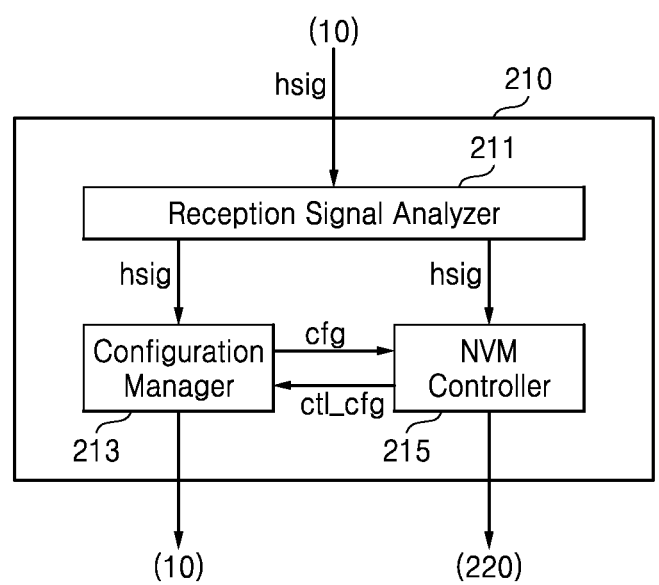
FIG. 5 is a block diagram further illustrating in one example the controller of FIG. 1.

FIG. 5 is a block diagram further illustrating the controller 210 of FIG. 1. Referring to FIGS. 1 and 5, the controller 210 may include a reception signal analyzer 211, a configuration manager 213, and an NVM controller 215.

The reception signal analyzer 211 analyzes the host signal (hsig) received from the host 10. The host signal (hsig) may include a unit selection signal for selecting at least one of the units 221-1 and 221-2. In other embodiments, the host signal (hsig) may include a new unit generation signal.

The host signal (hsig) may include at least one of a write/read signal and a unit configuration change signal. The write/read signal may include a write/read command, a write data, a start address, and the number of memory units on which the command will be executed. The reception signal analyzer 211 may transmit the host signal (hsig) to the configuration manager 213 when the host signal (hsig) includes the unit configuration change signal and may transmit the host signal (hsig) to the NVM controller 215 when the host signal (hsig) includes the write/read signal.

The configuration manager 213 may store unit configuration of each of the units 221-1 and 221-2. The unit configuration may include an address space, an effective capacity, an addressing mode, and a data processing policy for each of the units 221-1 and 221-2. The configuration manager 213 may change the unit configuration of the units 221-1 and 221-2 according to the host signal (hsig). For instance, the configuration manager 213 may generate a new unit in the NVM 220, change the unit configuration, or erase a unit according to the host signal (hsig). That is, the configuration manager 213 may change the address space or effective capacity of each unit according to the host signal (hsig). The configuration manager 213 may output unit configuration information (cfg) related with the unit configuration of the selected unit (e.g., 221-1) to the host 10 or the NVM controller 215 according to the unit selection signal in the host signal (hsig).

The NVM controller 215 may control the operation of the unit 221-1 according to the host signal (hsig) and the unit configuration information (cfg). The NVM controller 215 may communicate a configuration change signal (ctl_cfg) to the configuration manager 213 when it determines that unit configuration change is required for the unit 221-1. For instance, when the size of write data is larger than the residual capacity of the unit 221-1, the NVM controller 215 may transmit the configuration change signal (ctl_cfg) for changing the effective capacity of the unit 221-1 to the configuration manager 213.

Figure 6:
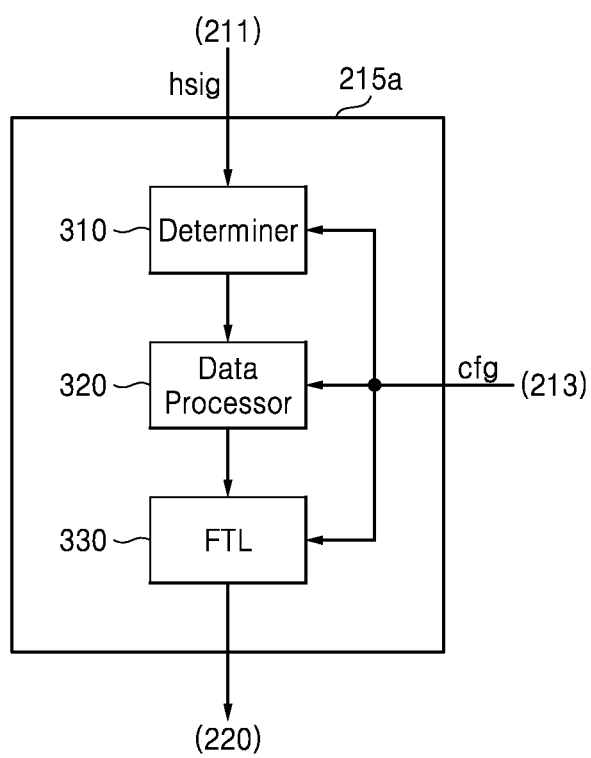
FIG. 6 is a diagram further illustrating in one example the NVM controller of FIG. 5.

FIG. 6 is a diagram further illustrating in one embodiment (215*a*) the NVM controller 215 of FIG. 5, and FIG. 7 is a table listing exemplary addressing modes and units of data output for the data processor 320 of FIG. 6. Referring to FIGS. 5, 6 and 7, the NVM 220 is assumed to be a NAND flash memory. The NVM controller 215*a* may be configured to include a determiner 310, the data processor 320, and a flash translation layer (FTL) 330. Operation of the NVM controller 215 when data is written to the NVM 220 will be described below.

The determiner 310 receives the host signal (hsig) and compares the size of data to be written with the residual capacity of a unit (hereinafter, referred to as a "selected unit") selected by the unit selection signal in the host signal (hsig). The determiner 310 may send a "no write" response to the host 10 when the residual capacity is less than the size of the data. Alternatively, when the residual capacity is less than the size of the data, the determiner 310 may control the configuration manager 213 to adjust the effective capacity of the selected unit. For instance, when a unit other than the selected unit has sufficient residual capacity, the effective capacity of the "unselected unit" may be reduced and the effective capacity of the selected unit may be correspondingly increased by the reduction. Consequently, the determiner 310 can adjust the residual capacity of the selected unit to be larger than the size of the data.

The determiner 310 may also be used to determine whether an address in the host signal (hsig) is valid. For instance, the host signal (hsig) may include a start address and information regarding a number of sectors to be written. The determiner 310 may determine whether the start address and an address obtained by adding the number of sectors to the start address are valid, that is, whether they fall within a given address space.

When the determiner 310 determines that the residual capacity is larger than the size of the data and the addresses are valid, the data processor 320 may process the write data included in the host signal (hsig). The data processor 320 may output the write data received sequentially to the FTL 330 in units predetermined according to an addressing mode set for each unit. The unit configuration information (cfg) may include information about the addressing mode of the selected unit.

When the addressing mode is "default", the data processor 320 may use a 512-byte sector when outputting the write data to the FTL 330. When the addressing mode is "big sector", the data processor 320 may use a big sector, such as a 4-KB sector or an 8-KB sector when outputting the write data to the FTL 330. When the addressing mode is "block and page", the data processor 320 may use one NAND page or multiple NAND pages. When the addressing mode is "block", the data processor 320 may use a NAND block. When the addressing mode is "byte", the data processor 320 may use a byte.

The above-described addressing modes are examples and the inventive concept is not restricted thereto. The configuration manager 213 may include other addressing modes apart from the above-described addressing modes according to the host signal (hsig) of the host 10.

The FTL 330 may convert the write data received from the data processor 320 into a signal that can be recognized by the NVM 220 and may output the signal to the NVM 220. The FTL 330 may execute a data processing policy for the selected unit according to the unit configuration information (cfg). In other embodiments, the data processor 320 may execute the data processing policy for the selected unit according to the unit configuration information (cfg).

Data processing policies may include a method of storing data mapping information, support or non-support of cache mode, execution or non-execution of data backup, a data write speed, execution or non-execution of garbage collection operations, a method of processing data when power supply is resumed following power-off, and so on. The configuration manager 213 may include other data processing policies apart from the above-described ones according to the host signal (hsig) of the host 10.

Figure 8:
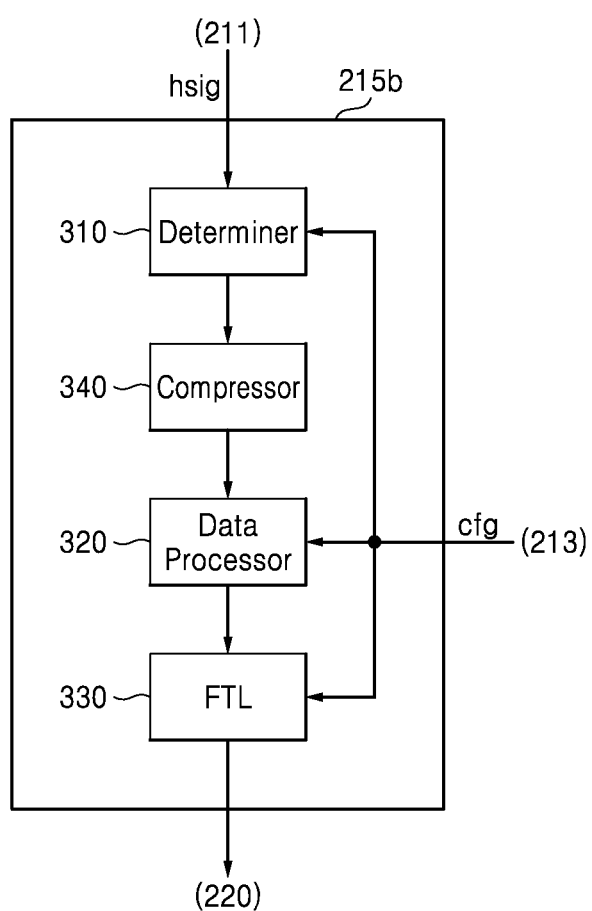
FIG. 8 is a diagram further illustrating in another example the NVM controller of FIG. 5.

FIG. 8 is a diagram further illustrating the NVM controller 215 of FIG. 5 according to another embodiment (215*b*). The NVM controller 215*b* illustrated in FIG. 8 is similar to the NVM controller 215*a* illustrated in FIG. 6, and only the relevant differences between these two embodiment will be described hereafter.

The embodiment illustrated in FIG. 8, NVM controller 215*b*, further includes a compressor 340. The compressor 340 may be used to compress received write data when the determiner 310 determines that the residual capacity is less than its corresponding data size. When the determiner 310 determines that the residual capacity is larger than the data size, the compressor 340 may be bypassed by the write data.

The compressor 340 may operate according to a selectable (or variable) compression. In certain embodiments of the inventive concept, the compressor 340 may be used to remove unused data from the write data to compress the data size of the write data.

In other embodiments, the host signal (hsig) may include a no compression command, and in response thereto the compressor 340 will allow the write data to bypass the compressor 340 altogether.

Figure 9:
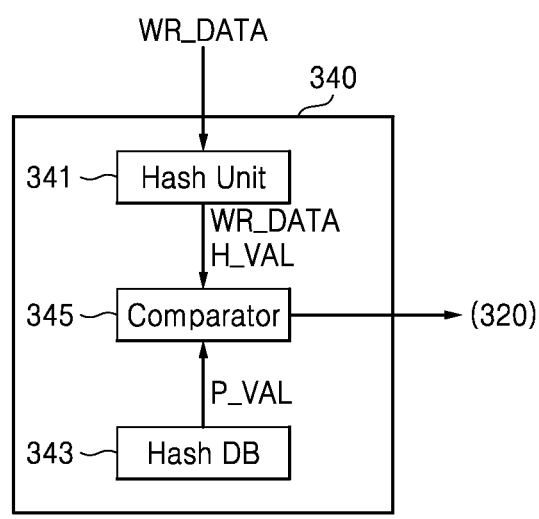
FIG. 9 is a diagram further illustrating in one example the compressor of FIG. 8 according to an embodiment of the inventive concept.

FIG. 9 is a diagram further illustrating in one example the compressor 340 of FIG. 8 according to an embodiment of the inventive concept. Referring to FIG. 9, the compressor 340 may be used to compress write data (WR_DATA) included in the host signal (hsig) using a conventionally understood de-duplication approach. In relevant part, the compressor 340 may include a hash unit 341, a hash database (DB) 343, and a comparator 345.

The hash unit 341 receives the write data (WR_DATA) and generates a corresponding hash value (H_VAL) by hashing the write data (WR_DATA) using an appropriate hashing function. The hash data base 343 may then be used to store pattern hash values (P_VAL). The pattern hash values (P_VAL) may be generated by hashing data having a particular data pattern. For instance, the particular data pattern may be a pattern in which data values of 0 or 1 are repeated, or data values of 0 and 1 are alternately repeated.

The comparator 345 may then be used to compare the hash value (H_VAL) with the pattern hash values (P_VAL). When the hash value (H_VAL) exists among the pattern hash values (P_VAL), the comparator 345 may output a signal indicating a corresponding pattern to the data processor 320. The data processor 320 may write data corresponding to the signal to the NVM 220 through the FTL 330. However, when the hash value (H_VAL) does not exist among the pattern hash values (P_VAL), the comparator 345 may output the write data (WR_DATA) to the data processor 320.

FIG. 10, inclusive of FIGS. 10A, 10B and 10C, is a diagram illustrating the generation and change of a storage unit according to certain embodiments of the inventive concept.

Referring to FIGS. 1 and 10A, it is assumed that the total capacity of the NVM 220 is 16 GB. The NVM 220 may include only the first unit Unit_0 in a default state, i.e., when it is shipped from a factory. The first unit Unit_0 may have an address space of 16 GB and an effective capacity of 16 GB. However, in other embodiments, the NVM 220 may not include any unit or may include a plurality of units in the default state.

The host 10 may request device information from the storage device 20. For instance, the host 10 may request the device information when the power for storage device 20 is powered on or when the unit configuration of the storage device 20 is changed. The configuration manager 213 of the storage device 20 may output at least one among the number of units and an address space, effective space, residual capacity, addressing mode and data processing policy of each unit to the host 10 in response to the request.

Referring to FIGS. 1 and 10B, the host 10 may determine that a unit for swap data only is needed. When adding a 1-GB swap unit, the host 10 may determine whether the sum of effective capacities of respective units exceeds the total capacity of the NVM 220. Since the total capacity of the NVM 220 has been allocated for the effective capacity of the first unit Unit_0, the host 10 may determine to change the effective capacity of the first unit Unit_0 in order to generate a new unit. The host 10 may send the storage device 20 an effective capacity change request instructing to change the effective capacity of the first unit Unit_0 into 15 GB.

The configuration manager 213 may determine whether the changed effective capacity exceeds the total capacity of the storage device 20 in response to the request. When the changed effective capacity does not exceed the total capacity of the storage device 20, the configuration manager 213 may change the effective capacity into 15 GB and send an effective capacity change response to the host 10.

Referring to FIGS. 1 and 10C, the host 10 may send the storage device 20 a unit addition request instructing to generate the second unit Unit_1 having a 16-GB address space and a 1-GB effective capacity. In response to the request, the configuration manager 213 may determine whether the sum of the effective capacities of the respective units Unit_0 and Unit_1 exceeds the total capacity of the storage device 20, generate the second unit Unit_1 when the sum does not exceed the total capacity, and send a unit addition response to the host 10.

According to certain embodiments of the inventive concept, the host 10 may request the storage device 20 to change an address mode or a data processing policy for the first or second unit Unit_0 or Unit_1. In response to the request, the configuration manager 213 may determine whether the change is possible, may change the addressing mode or the data processing policy, and may send a change response to the host 10.

In a state where the first unit Unit_0 of the storage device 20 has the 16-GB effective capacity, as illustrated in FIG. 10A, the host 10 may send the storage device 20 a unit addition request instructing to generate the second unit Unit_1 having the 16-GB address space and the 1-GB effective capacity. In response to the request, the configuration manager 213 may determine that the sum of the units' effective capacities exceeds the total capacity of the storage device 20 and then determine whether there is any unit (i.e., the first unit Unit_0 in this case) having a residual capacity in the storage device 20. When the first unit Unit_0 has a residual capacity of 1 GB or more, the configuration manager 213 may reduce the effective capacity of the first unit Unit_0 by 1 GB and generate the second unit Unit_1.

Alternately, when there are a plurality of units having residual capacity, the configuration manager 213 may reduce the effective capacity of each unit according to predetermined weights, or reduce the effective capacity of one of the units according to a defined prioritization and then generate a new unit.

TABLE 1

|  | Effective capacity | Residual capacity | Hard effective capacity | Lendable capacity |
| --- | --- | --- | --- | --- |
| Unit_0 | 14 GB | 6 GB | 10 GB | 4 GB |
| Unit_1 | 2 GB | 0 GB | 2 GB | 0 GB |

Table 1 shows an exemplary unit configuration that may be assumed in relation to certain embodiments of the inventive concept. Referring to Table 1, it is assumed that the first unit Unit_0 has a 14-GB effective capacity, an 8-GB used capacity, and a 6-GB residual capacity and that the second unit Unit_1 has a 2-GB effective capacity, a 2-GB used capacity, and a 0-GB residual capacity.

The hard effective capacity is an effective capacity that must be secured in each unit in any circumstances. The hard effective capacity is less than the effective capacity. The lendable capacity is a smaller one between the effective capacity minus the hard effective capacity and the residual capacity.

When data is additionally written to the second unit Unit_1, the lendable capacity, i.e., 4 GB of the first unit Unit_0 may be used. In other words, the effective capacity of the first unit Unit_0 may be reduced to 10 GB and the effective capacity of the second unit Unit_1 may be increased to 6 GB.

When the hard effective capacity of the first unit Unit_0 is set to 6 GB or less, the lendable capacity of the first unit Unit_0 becomes the same as the residual capacity, so that the second unit Unit_1 can borrow 6 GB from the first unit Unit_0.

TABLE 2

|  | Data type | Addressing mode |
| --- | --- | --- |
| Unit_0 | Normal user data | Sector |
| Unit_1 | Swap data | Block & Page |
| Unit_2 | Boot data | Block |
| Unit_3 | Log data | Byte |

Table 2 shows another exemplary unit configuration that may be assumed for other embodiments of the inventive concept. Referring to Table 2, the NVM is assumed to include four units.

The first unit Unit_0 may store normal user data and its addressing mode may be set to "sector". The second unit Unit_1 may store swap data and its addressing mode may be set to "block & page". The third unit Unit_2 may store boot data and its addressing mode may be set to "block". The fourth unit Unit_3 may store log data and its addressing mode may be set to "byte".

Here, the "swap data" may be characterized as temporary data. The boot data or operating system (OS) library data is characterized by being read only. A data processing policy for a unit may be set according to one or more characteristic(s) of the data. The data processing policy may be set by the host 10.

Assuming that normal data is stored in the first unit Unit_0, and swap data is stored in the second unit Unit_1, a data processing policy controlling the management of the data stored in each unit will be described with reference to FIGS. 11, 12, 13, 14, 15, 16 and 17 hereafter.

Figure 11A:
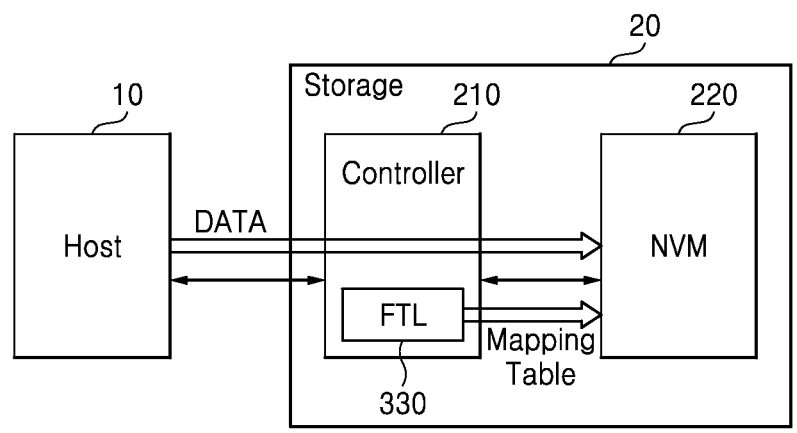
FIG. 11, inclusive of FIGS. 11A and 11B, is a conceptual diagram illustrating signal flow in the computer system of FIG. 1.
Figure 11B:
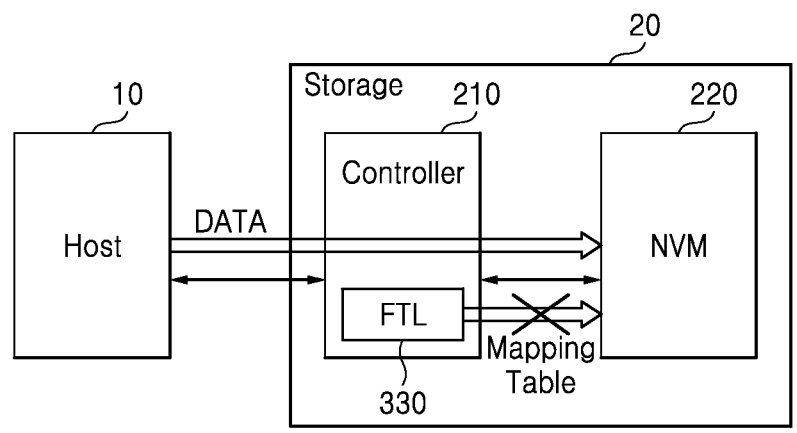

FIG. 11, inclusive of FIGS. 11A and 11B, is a conceptual diagram illustrating signal flow in the computer system 1 of in FIG. 1. Referring to FIG. 11, the host 10 is assumed to communicate write data to the NVM 220 via the controller 210.

The FTL 330 included in the controller 210 may include volatile memory, e.g., SRAM, storing an L2P table for each unit. During a data write operation, the L2P table may be updated.

When normal data is written to the first unit Unit_0, the FTL 330 may periodically store the L2P table updated in the NVM 220. Therefore, even when the storage device 20 is powered off, mapping information is retained.

In contrast, swap data is valid during only single power cycle. Here, the term "power cycle" means a period beginning with power-on of the storage device 20 until a following power-off of the storage device 20. Since swap data become invalid upon power-off of the storage device 20, the storage device 20 does not need to retain an L2P table for the swap data. Accordingly, when swap data is written to the second unit Unit_1, the FTL 330 may not store the L2P table updated in the NVM 220.

According to certain embodiments of the inventive concept, the FTL 330 may periodically store an L2P table updated with respect to each of the first and second units Unit_0 and Unit_1 in the NVM 220. Meanwhile, the FTL 330 may store at least one log block lastly processed in the NVM 220.

When the storage device 20 is powered on, the FTL 330 may receive the L2P table for the first unit Unit_0 and the log block from the NVM 220. An operation of the FTL 330 receiving the log block is referred to as a "scan operation".

The L2P table received from the NVM 220 is the one that the FTL 330 stored lastly in the NVM 220 before the power-off. However, since the FTL 330 may have performed additional data writing after it stored the L2P table in the NVM 220, the received L2P table may not be the latest one before the power-off. The FTL 330 may update the L2P table according to the log block, thereby restoring the latest L2P table.

The FTL 330 may not perform a scan operation since it does not need an L2P table updated before the power-off for the second unit Unit_1. Therefore, the time required to "open" the storage device 20 for use upon power-on may be reduced.

Figure 12A:
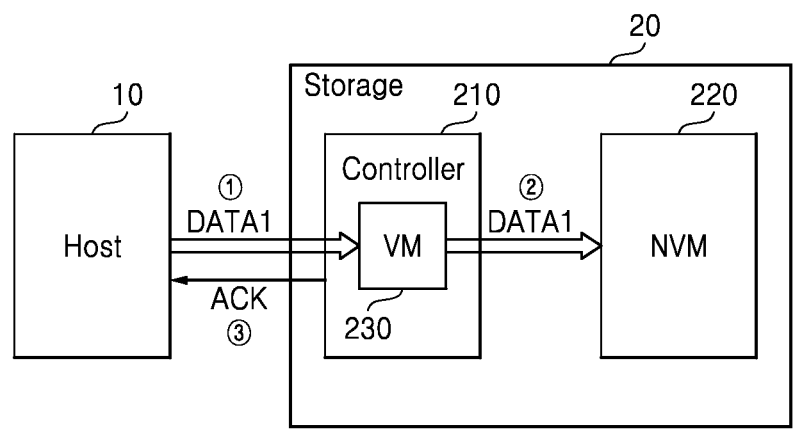
FIG. 12A is a diagram illustrating a normal write operation being executed in the computer system of FIG. 1, as compared with the diagram of FIG. 12B illustrating an autonomous cached write operation being executed in the computer system of FIG. 1.
Figure 12B:
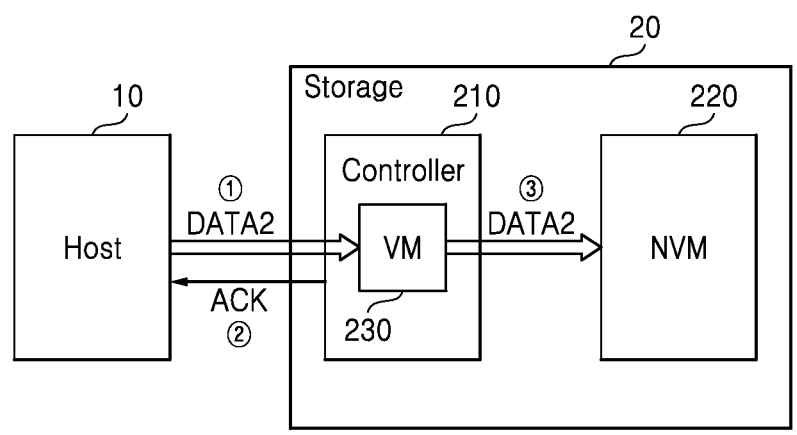

FIG. 12A is a diagram illustrating execution of a normal write operation by the computer system 1 of FIG. 1, whereas by way of comparison, FIG. 12B is a diagram illustrating execution of an autonomous cached write operation by the computer system 1 of FIG. 1.

Referring to FIG. 12A, the host 10 is assumed to transmit normal data DATA1 to the controller 210 (①). Here, it is further assumed that the controller 210 includes a volatile memory (VM) 230. However, in other embodiments, the VM 230 may be located external to the controller 210.

The controller 210 may be used to store the normal data DATA1 in the VM 230. The controller 210 may store the normal data DATA1 in the NVM 220 (②) and may send a completion signal (ACK) to the host 10 (③).

Referring now to FIG. 12B, the host 10 is assumed to transmit swap data DATA2 to the controller 210. The controller 210 may store the swap data DATA2 in the VM 230 and send the completion signal (ACK) to the host 10 (②).

Thereafter, the controller 210 may store the swap data DATA2 in the NVM 220 (③). Accordingly, since cache operation can be performed regardless of the activation or deactivation of cache in the storage device 20 (e.g., an eMMC in certain embodiments of the inventive concept), the write speed of the storage device 20 is improved.

Figure 13:
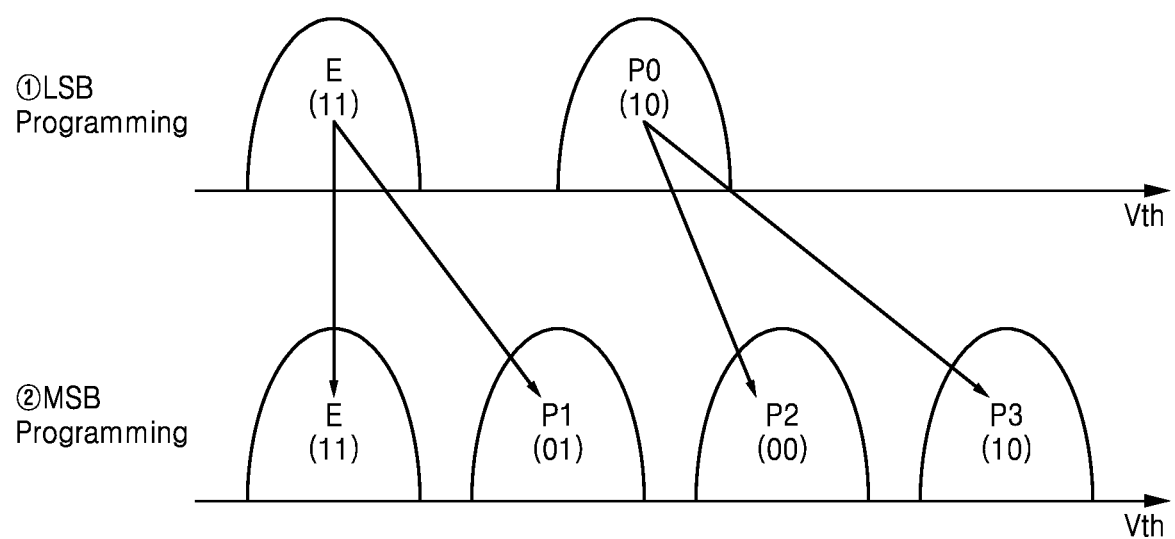
FIG. 13 is a diagram illustrating the programming of a 2-bit multi-level cell (MLC) in a NAND flash memory.

FIG. 13 is a conceptual diagram illustrating the programming of a 2-bit multi-level cell (MLC) in a NAND flash memory. Referring to FIGS. 1 and 13, the NVM 220 may be a NAND flash memory including a plurality of 2-bit MLCs.

After the programming is completed, an MLC may have one of four states, i.e., an erased state E, a first programmed state P1, a second programmed state P2, and a third programmed state P3. A threshold voltage Vth of the MLC will be different according to each data state.

When programming an MLC, the least significant bit (LSB) may be programmed first as either an erased state E or as a zero programmed state P0 (①) and then the most significant bit (MSB) may be programmed (②). When the NAND flash memory 220 is powered off and then powered on during the MSB programming, an LSB value that has been programmed may be lost.

When writing normal data to the first unit Unit_0, the NAND flash memory 220 may back up the LSB to a spare space in the NAND flash memory 220 before programming the MSB, which is programmed after programming the LSB.

Meanwhile, since swap data becomes invalid after the power-off, the NAND flash memory 220 may program the MSB without backing up the LSB after programming the LSB when writing the swap data to the second unit Unit_1. Therefore, the write speed of the storage device 20 is increased and the erase count of the NAND flash memory 220 is decreased.

FIG. 14 is a page mapping table that may be assumed for the host 10 according to certain embodiments of the inventive concept, and FIG. 15 is a diagram indicating the validity of each page based on the page mapping table of in FIG. 14.

Referring to FIGS. 1, 3, and 14, the MMU 130 of the host 10 may be used to map the first VA group VA0 to the PA of the main memory 120 and may map the second VA group VA1 corresponding to the first unit 221-1 to the first LBA LBA1 The MMU 130 may directly map the third VA address group VA2 corresponding to the second unit 221-2 to the PA of the NAND flash memory 220 instead of the second LBA LBA2. At this time, the controller 210 may not store an L2P table for the second unit 221-2 or may store a smaller L2P table for the second unit 221-2.

Further, the controller 210 may not need to perform garbage collection with respect to the NAND flash memory 220. The host 10 instead of the controller 210 may perform garbage collection with respect to the NAND flash memory 220.

For instance, it is assumed with respect to the second unit 221-2 that a VA of 201 is mapped to the second page in the first block, i.e., (0, 1); a VA of 202 is mapped to the fourth page in the first block, i.e., (0, 3); a VA of 203 is mapped to the second page in the fourth block, i.e., (3, 1); and in the same manner VAs up to a VA of 206 are directly mapped to a page of the NAND flash memory 220.

Referring to FIGS. 14 and 15, the host 10 may be used to store a validity table showing whether each page is valid based on the page mapping table. In other embodiments, the host 10 may dynamically construct a validity table based on the page mapping table instead of storing the validity table.

In the validity table of FIG. 15, the symbol "O" indicates that a page in a block has been mapped to a VA, and therefore, data of the page in the block is valid; and the symbol "X" indicates that a page in a block has not been mapped to a VA, and therefore, data of the page in the block is invalid. For instance, since a fourth page Page3 in a first block Block0 of the second unit 221-2 is mapped to the VA of 202, data of the fourth page Page3 in the first block Block0 is valid.

When the data of the fourth page Page3 in the first block Block0 is swapped in, the VA of 202 is mapped to the PA of the main memory 120. Accordingly, a value corresponding to the fourth page Page3 in the first block Block0 in the validity table is changed into "X".

A method of the host 10 performing garbage collection using the validity table will be described below.

The host 120 may perform garbage collection according to particular conditions. During the garbage collection, the host 10 searches blocks for a block having the least amount of valid data. For instance, the host 10 may confirm that a second block Block1 and a third block Block2 have the least amount of valid data and may select at least one block, e.g., the second block Block1, between the second and third blocks Block1 and Block2.

The host 10 controls a third page Page2 in the second block Block1 of the NAND flash memory 220 to be swapped in to the main memory 120. Accordingly, the third page Page2 in the second block Block1 is mapped to the PA of the main memory 120, and therefore, a value corresponding to the third page Page2 in the second block Block1 in the validity table is changed into "X".

Since the second block Block1 does not include any valid page, the host 10 may control the storage device 20 to release and de-allocate the second block Block1. Thereafter, the host 10 may control the storage device 20 to allocate a new second block Block1.

It is assumed that the host 10 and the controller 210 store the page mapping table and the L2P table illustrated in FIG. 3 with respect to the second unit 221-2 storing swap data. When the host 10 reads the swap data from the storage device 20, the storage device 20 may not invalidate the swap data that has been read out.

The swap data that has been read is now considered invalid. However, the controller 210 may duplicate the swap data during garbage collection. Consequently, the controller 210 may perform unnecessary data duplication.

Meanwhile, when the host 10 reads the swap data, it may transmit a discard or trim command with respect to the swap data to the storage device 20. In response to the command, the storage device 20 may release the swap data from mapping and invalidate the swap data. However, in this case, the controller 210 has overhead by writing changed meta data, e.g., a mapping table.

According to some embodiments of the inventive concept, the host 10 rather than the storage device 20 may be used to perform garbage collection with respect to swap data. Therefore, the amount of the L2P table stored in the controller 210 may be reduced and the controller 210 is prevented from performing unnecessary data duplication. As a result, the operating speed and efficiency of the storage device 20 are enhanced.

Herein below, a method by which the host 10 performs garbage collection when the storage device 20 performs block mapping and the mapping table of the host 10 maps a VA to a LBA with respect to the second unit 221-2 storing swap data will be described with reference to FIGS. 16 and 17.

Figure 16:
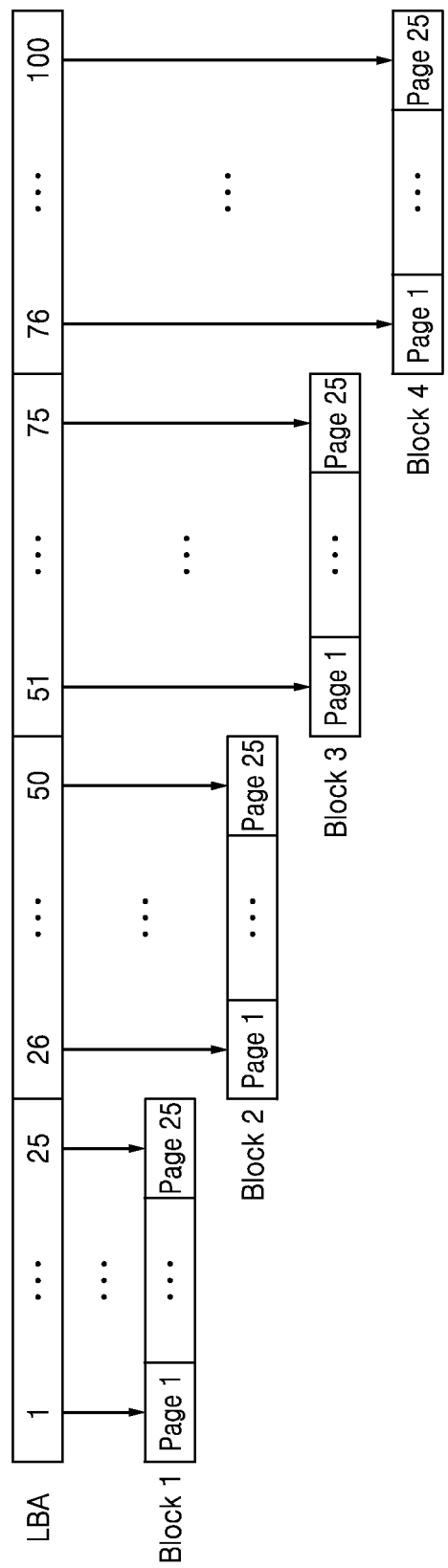
FIG. 16 is a diagram of the block mapping of a storage device according to some embodiments of the inventive concept.

FIG. 16 is a diagram illustrating block mapping for the storage device 20 according to embodiments of the inventive concept. Referring to FIGS. 1 and 16, the storage device 20 may receive LBAs from 1 to 100 with respect to the second unit 221-2. It is assumed that the second unit 221-2 includes four blocks and each block includes 25 pages.

The controller 210 may respectively map LBAs of 1 to 25 to first through 25th pages in the first block of the second unit 221-2. The controller 210 may respectively map LBAs of 26 to 50 to first through 25th pages in the second block of the second unit 221-2. In the same manner, the controller 210 may map LBAs of 51 to 100 to third and fourth blocks.

FIG. 17 is a validity table that may be stored in the host 10 during execution of the block mapping method of FIG. 16. Referring to FIGS. 1, 16, and 17, the MMU 130 of the host 10 may store the page mapping table shown in FIG. 3 and may additionally store the validity table shown in FIG. 17 for the second unit 221-2.

The validity table may store a validity value of each of the second LBAs LBA2, i.e., 1 through 100 corresponding to the second unit 221-2. The validity value may be "O" when data is swapped out to a PA of the NVM 220 and it may be "X" when data is swapped in to the main memory 120 from a PA of the NVM 220.

The host 10 may perform garbage collection according to particular conditions. When performing the garbage collection, the host 10 searches blocks for a block having the least validity. For instance, the host 10 may determine that a third block Block3 has the least validity and the validity value corresponding to the LBA of 51 only in the third block Block3 is "O". The host 10 may control the storage device 20 to swap in the first page of the third block Block3, which corresponds to the LBA of 51. As a result, the validity value of the LBA of 51 is changed into "X". Since the third block Block3 does not include any valid page, the host 10 controls the storage device 20 to release and de-allocate the third block Block3. Thereafter, the host 10 may control the storage device 20 to newly allocate the third block Block3.

Meanwhile, since swap data written to the storage device 20 becomes invalid once read, read retention does not need to be guaranteed for the swap data. Accordingly, the controller 210 of the storage device 20 may set a programming time to be shorter when writing swap data than when writing normal data so that read retention is guaranteed for just a predetermined number of, e.g., 1 or 10 times of reading. As a result, the write performance is enhanced.

Mapping information may be retained in larger units for swap data than for normal data. For instance, the controller 210 may perform coarse-grained mapping for swap data and may perform fine-grained mapping for normal data. As a result, the required amount of SRAM included in the FTL 330 is reduced and the write/read performance is enhanced.

During swap data reading, the controller 210 may discard swap data that has been read. Meanwhile, when the storage device 20 is opened or closed, the controller 210 may also discard swap data. For instance, the host 10 may inform the storage device 20 of the closing of the storage device 20 and the storage device 20 may discard swap data in response to the information. As a result, provisioning space can be secured.

Figure 18:
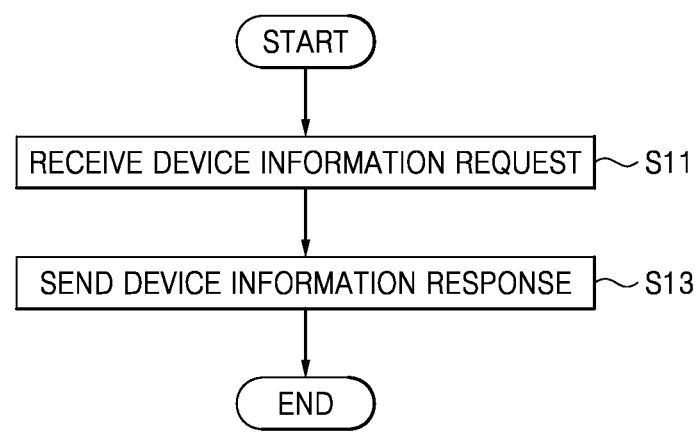
FIG. 18 is a flowchart of unit information response of a storage device according to some embodiments of the inventive concept.

FIG. 18 is a flowchart summarizing a unit information response for the storage device 20 according to embodiments of the inventive concept. Referring to FIG. 18, the storage device 20 receives a device information request from the host 10 (S11). The storage device 20 sends a device information response to the host 10 in response to the request (S13). Here, the device information response may include an effective capacity, residual capacity and addressing mode of each unit and a total unit number.

Figure 19:
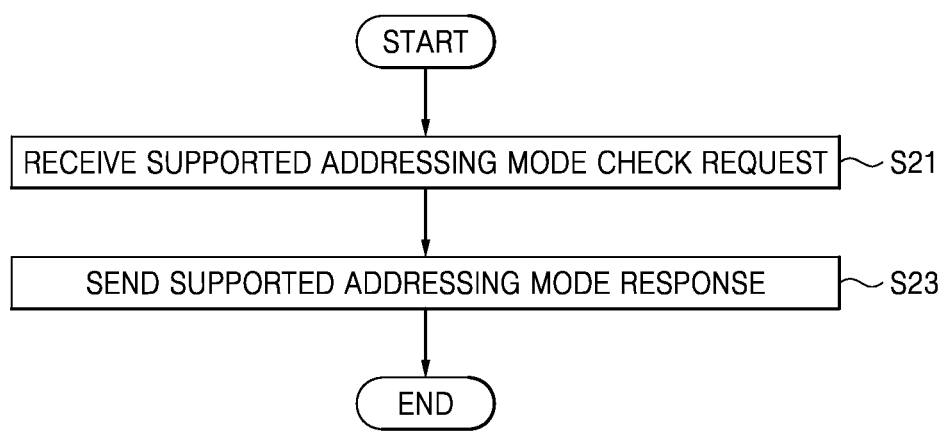
FIG. 19 is a flowchart of supported addressing mode response of a storage device according to some embodiments of the inventive concept.

FIG. 19 is a flowchart summarizing a supported addressing mode response for the storage device 20 according to embodiments of the inventive concept. Referring to FIG. 19, the storage device 20 receives a supported addressing mode determination request from the host 10 (S21). The storage device 20 sends a supported addressing mode response to the host 10 in response to the request (S23). Here, the response may be a sector, a big sector, a block, a block & page, a byte, or another addressing mode set by the host 10.

Figure 20:
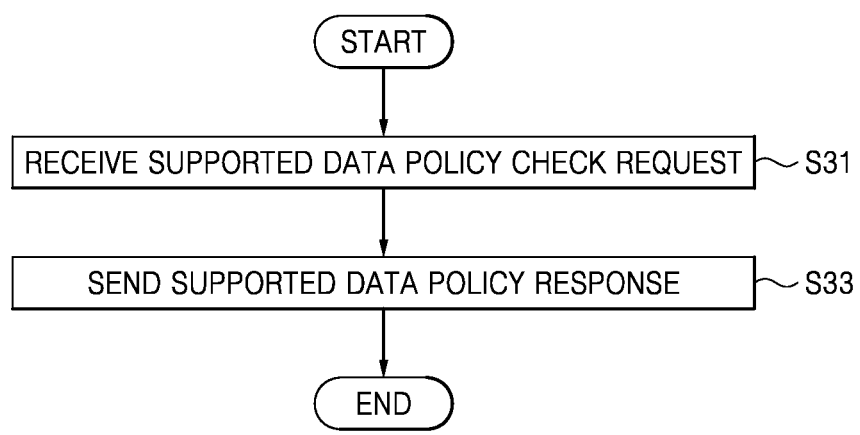
FIG. 20 is a flowchart of supported data policy response of a storage device according to some embodiments of the inventive concept.

FIG. 20 is a flowchart summarizing a supported data policy response for the storage device 20 according to embodiments of the inventive concept. Referring to FIG. 20, the storage device 20 receives a supported data policy determination request from the host 10 (S31). The storage device 20 sends a supported data policy response to the host 10 in response to the request (S33). Here, the response may include non-volatile mapping status, support or non-support of automatic cache mode, the level of read retention, existence or non-existence of data discarding at power-off, and performing or non-performing of garbage collection of the storage device 20.

Figure 21:
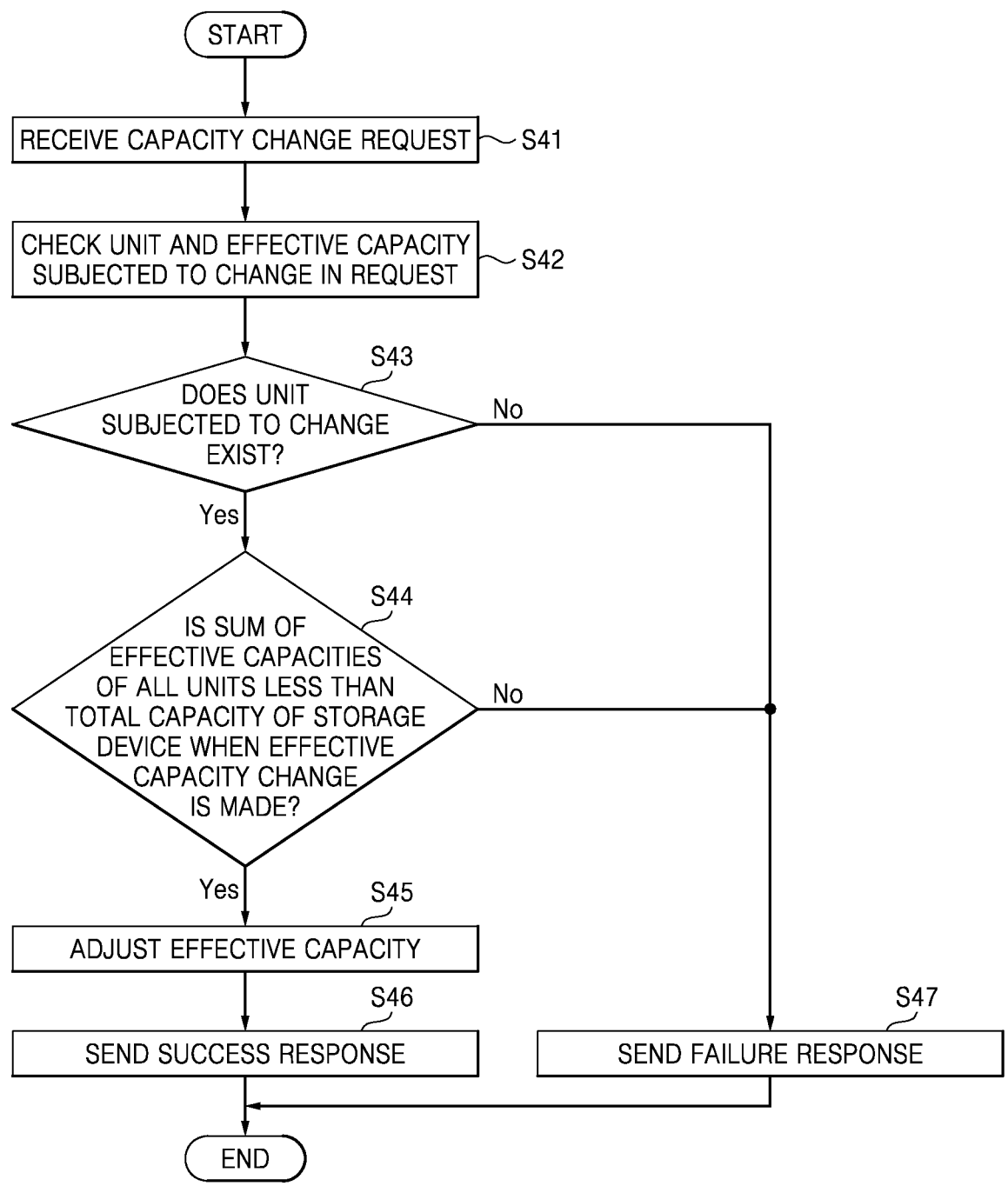
FIG. 21 is a flowchart of effective capacity control of a storage device according to some embodiments of the inventive concept.

FIG. 21 is a flowchart summarizing an effective capacity control method for the storage device 20 according to embodiments of the inventive concept. Referring to FIG. 21, the storage device 20 receives a capacity change request from the host 10 (S41). The storage device 20 determines a unit and effective capacity subjected to change in the request (S42).

The storage device 20 determines whether the unit subjected to change exists (S43) and determines whether the sum of effective capacities of all units is less than the total capacity of the storage device 20 when the effective capacity subjected to change is changed (S44). When the unit subjected to change exists and the sum is less than the total capacity, the storage device 20 adjusts the effective capacity (S45) and sends a capacity adjustment success response to the host 10 (S46).

When the unit subjected to change does not exist or the sum is larger than the total capacity, the storage device 20 sends a capacity adjustment failure response to the host 10 (S47).

Figure 22:
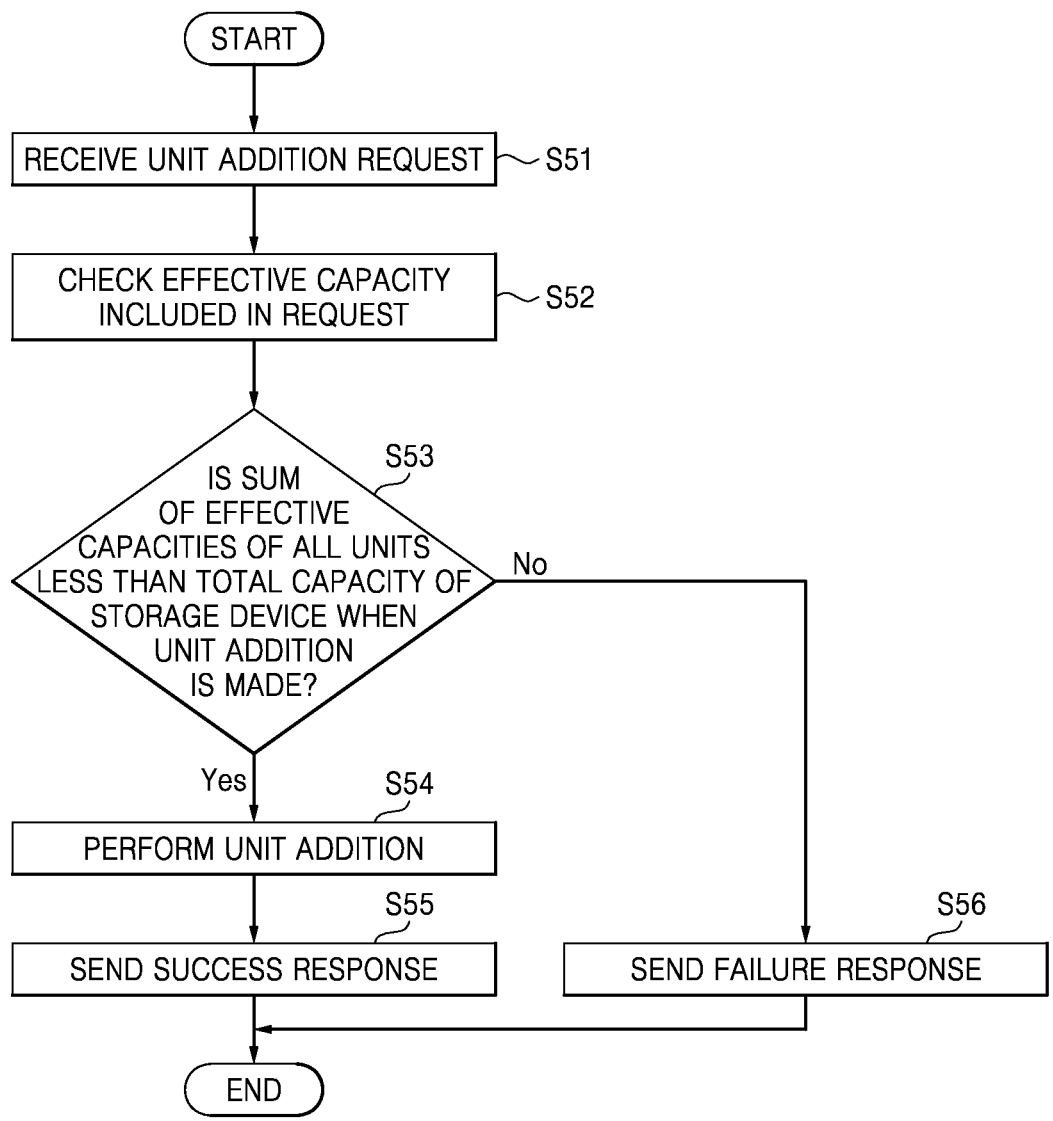
FIG. 22 is a flowchart of unit addition according to some embodiments of the inventive concept.

FIG. 22 is a flowchart summarizing a unit addition method according to embodiments of the inventive concept. Referring to FIG. 22, the storage device 20 receives a unit addition request from the host 10 (S51). The storage device 20 determines an effective capacity included in the request (S52). The storage device 20 determines whether the sum of effective capacities of all units is less than the total capacity of the storage device 20 when unit addition is made (S53).

When the sum is less than the total capacity, the storage device 20 performs unit addition (S54) and sends a unit addition success response to the host 10 (S55). When the sum is larger than the total capacity, the storage device 20 sends a unit addition failure response to the host 10 (S56).

Figure 23:
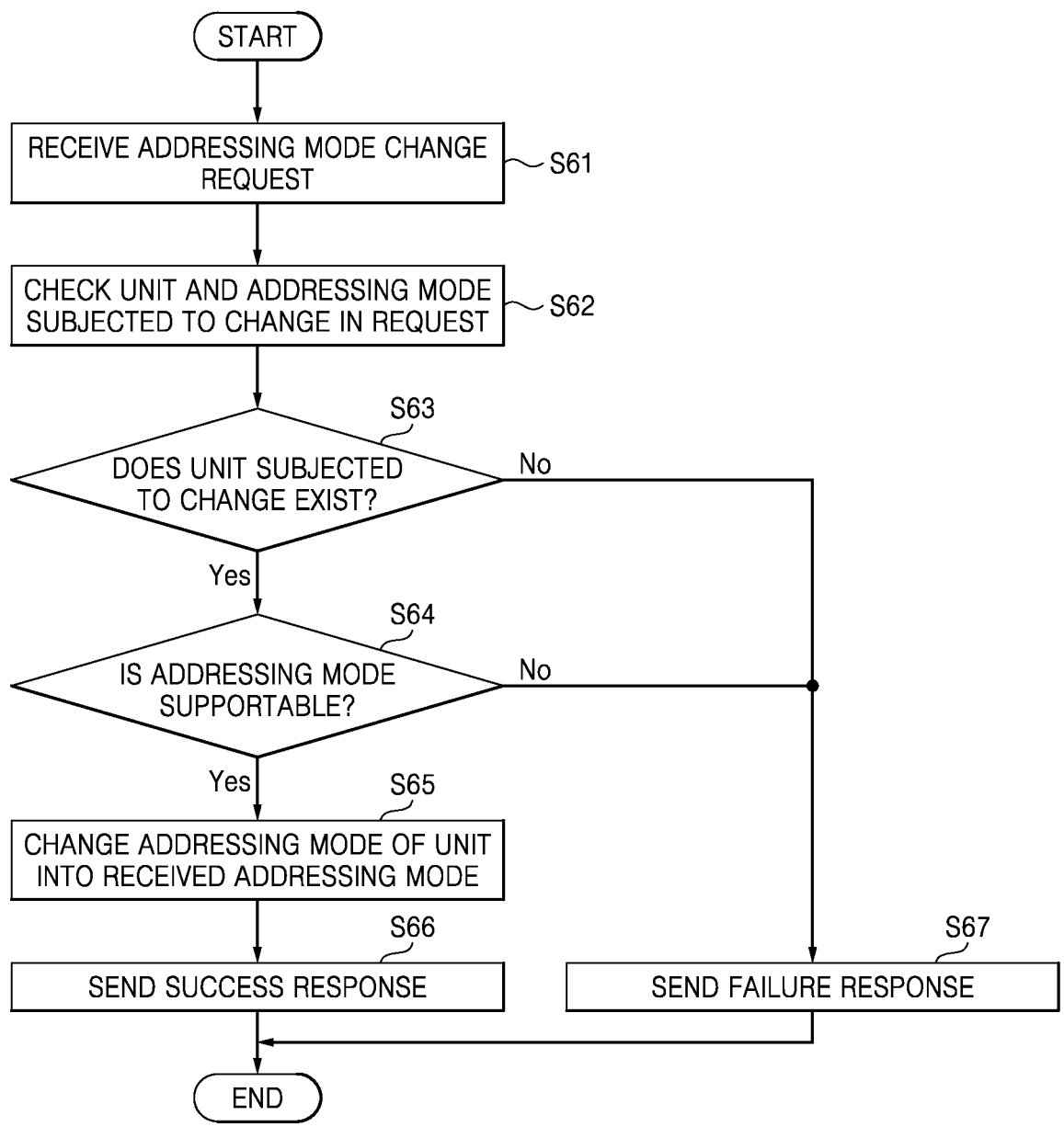
FIG. 23 is a flowchart of addressing mode changing according to some embodiments of the inventive concept.

FIG. 23 is a flowchart summarizing an addressing mode changing method according to embodiments of the inventive concept. Referring to FIG. 23, the storage device 20 receives an addressing mode change request from the host 10 (S61). The storage device 20 determines a unit and addressing mode subjected to change in the request (S62). The storage device 20 determines whether the unit subjected to change exists (S63) and whether the addressing mode is supportable (S64).

When the unit exists and the addressing mode is supportable, the storage device 20 changes the addressing mode of the unit into the received addressing mode (S65) and sends an address mode change success response to the host 10 (S66). When the unit does not exist or the addressing mode is not supportable, the storage device 20 sends an address mode change failure response to the host 10 (S67).

Figure 24:
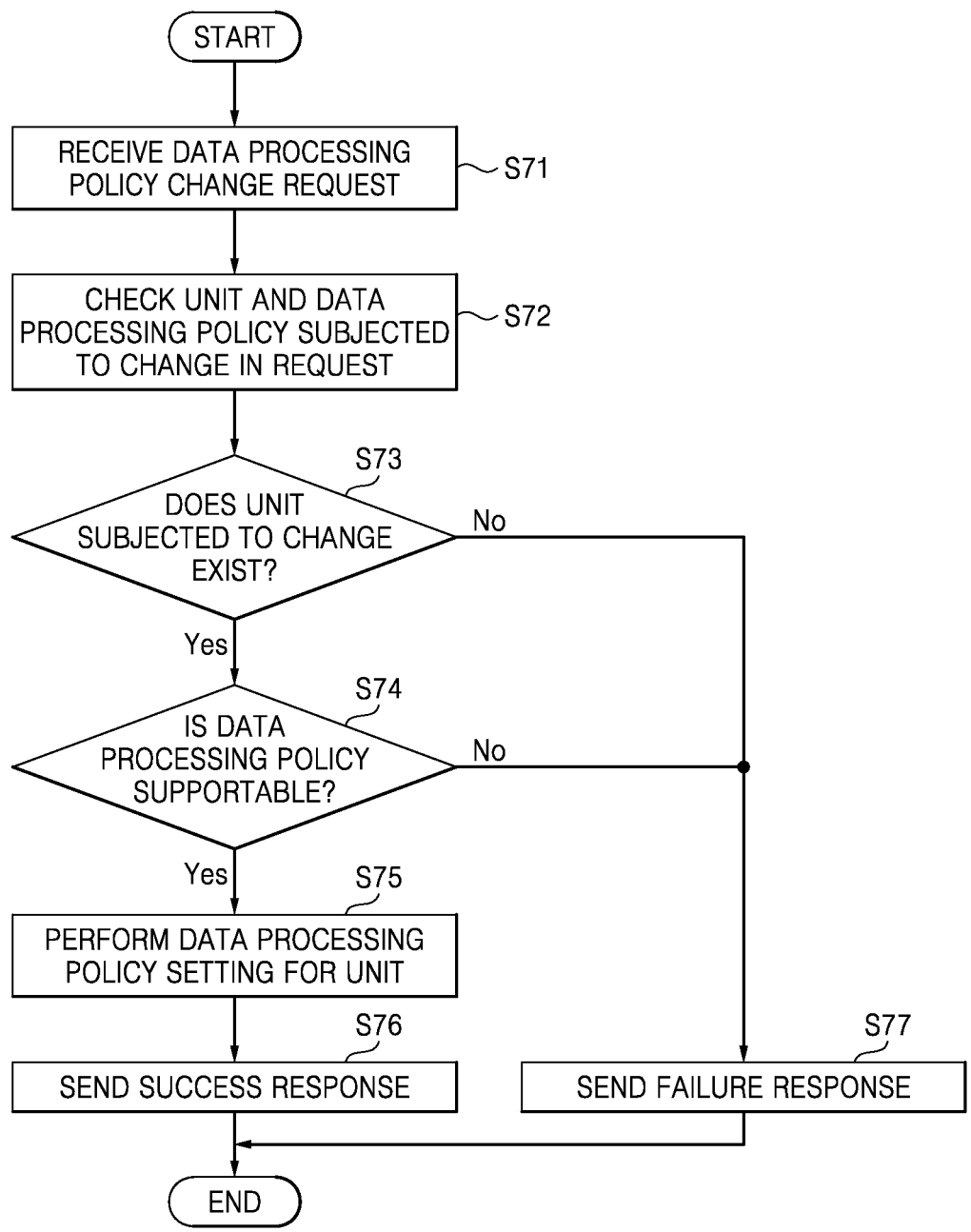
FIG. 24 is a flowchart of data processing policy setting according to some embodiments of the inventive concept.

FIG. 24 is a flowchart summarizing a data processing policy setting method according to embodiments of the inventive concept. Referring to FIG. 24, the storage device 20 receives a data processing policy change request from the host 10 (S71). The storage device 20 determines a unit and data processing policy subjected to change in the request (S72). The storage device 20 determines whether the unit subjected to change exists (S73) and whether the data processing policy is supportable (S74).

When the unit exists and the data processing policy is supportable, the storage device 20 performs data processing policy setting for the unit (S75) and sends a data processing policy setting success response to the host 10 (S76). When the unit does not exist or the data processing policy is not supportable, the storage device 20 sends a data processing policy setting failure response to the host 10 (S77).

Figure 25:
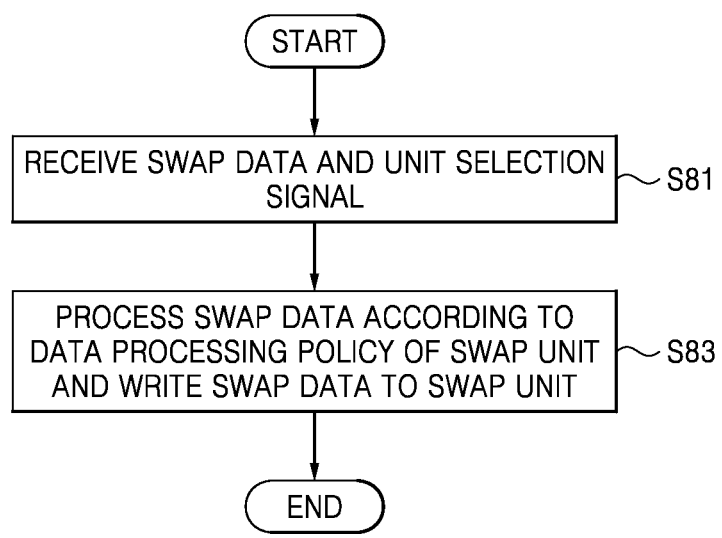
FIG. 25 is a flowchart of a data write method according to some embodiments of the inventive concept.

FIG. 25 is a flowchart summarizing a data write method according to embodiments of the inventive concept. Referring to FIG. 25, the storage device 20 receives swap data and a unit selection signal from the host 10 (S81). The storage device 20 processes the swap data according to a data processing policy of a swap unit and then writes the swap data to the swap unit (S83).

The present general inventive concept can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

As described above, according to certain embodiments of the inventive concept, a data processing scheme appropriate to the characteristics of each of storage units included in a storage device is provided for each storage unit, such that the storage device may be more efficiently managed in the overall operation of the storage device and computer system.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A method of operating a storage device including a non-volatile memory, having a normal unit configured to store normal data and a swap unit configured to store swap data, and a controller configured to control operation of the non-volatile memory, the method comprising:
   receiving swap data and a unit selection signal selecting the swap unit from a host; and
   processing the swap data according to a first data processing policy operationally associated with the swap unit to write the swap data to the swap unit, wherein:

the first data processing policy is different than a second data processing policy operationally associated with the normal unit to write normal data to the normal unit, each of the normal unit and the swap unit is configured to be respectively provided an address space unrelated to a capacity of the non-volatile memory, the address space is configured to be used consistently, although the capacity of each of the normal unit and the swap unit is changed, the non-volatile memory includes multi-level cell flash memory cells, the first data processing policy precludes the controller from backing up first least-significant-bit (LSB) data of the swap data after the first LSB data is written to the swap unit, the second data processing policy backs up second LSB data of the normal data after the second LSB data is written to the normal unit, and the swap data differs from the normal data in that the swap data is valid only while power is continually provided to the storage device and the swap data has not been accessed by a read operation.

2. The method of claim 1, wherein the first data processing policy precludes the non-volatile memory from storing a mapping table for the swap data stored in the swap unit.

3. The method of claim 1, wherein the first data processing policy causes the swap data to be written to the swap unit in a cache mode.

4. The method of claim 1, wherein during a power-on procedure executed after processing the swap data according to the first data processing policy and writing the swap data to the swap unit, the controller omits execution of a scan operation related to a log block of the non-volatile memory associated with the swap unit.

5. The method of claim 1, wherein during a power-on procedure or a power-off procedure executed after processing the swap data according to the first data processing policy and writing the swap data to the swap unit, the controller discards the swap data stored in the swap unit.

6. The method of claim 1, wherein the storage device further comprises a volatile memory configured to store mapping data for the swap data stored in the swap unit, the mapping data for the swap data being coarse-grained mapping data.

7. The method of claim 1, wherein following the processing of the swap data according to the first data processing policy and writing the swap data to the swap unit, the method further comprises:

reading the swap data from the swap unit; and thereafter, discarding the swap data read from the swap unit.

8. The method of claim 1, wherein writing of the swap data to the swap unit is performed at a faster speed than writing of the normal data to the normal unit.

9. The method of claim 1, wherein following the processing of the swap data according to the first data processing policy and writing of the swap data to the swap unit, the method further comprises executing garbage collection operations directed to the swap unit using the host.

10. A storage device comprising:

a non-volatile memory including a normal unit configured to store normal data associated with a normal write operation, and a swap unit configured to store swap data associated with operations other than the normal write operation; and a controller configured to control operation of the non-volatile memory to store the normal data and the swap data according to different respective data processing policies, wherein:

the controller, upon receiving from a host the swap data and a unit selection signal that selects the swap unit, processes the swap data according to a first data processing policy operationally associated with the swap unit to write the swap data to the swap unit, the first data processing policy being different than a second data processing policy operationally associated with the normal unit to write normal data to the normal unit, each of the normal unit and the swap unit is configured to be respectively provided an address space unrelated to a capacity of the non-volatile memory, the address space is configured to be used consistently, although the capacity of each of the normal unit and the swap unit is changed, the non-volatile memory includes multi-level cell flash memory cells, the first data processing policy precludes the controller from backing up first least-significant-bit (LSB) data of the swap data after the first LSB data is written to the swap unit, the second data processing policy backs up second LSB data of the normal data after the second LSB data is written to the normal unit, and the swap data differs from the normal data in that the swap data is valid only while power is continually provided to the storage device and the swap data has not been accessed by a read operation.

11. The storage device of claim 10, wherein the controller causes the non-volatile memory to omit storing of a mapping table for the swap data stored in the swap unit after processing the swap data according to the first data processing policy.

12. The storage device of claim 10, wherein during a power-on procedure executed by the controller, after processing of the swap data according to the first data processing policy and writing the swap data to the swap unit, the controller omits execution of a scan operation related to a log block of the non-volatile memory associated with the swap unit.

13. The storage device of claim 10, wherein during a power-on procedure or a power-off procedure executed by the controller, after processing of the swap data according to the first data processing policy and writing the swap data to the swap unit, the controller discards the swap data stored in the swap unit.

14. The storage device of claim 10, wherein the storage device further comprises a volatile memory configured to store mapping data for the swap data stored in the swap unit, the mapping data for the swap data being coarse-grained mapping data.

15. The storage device of claim 10, wherein the controller causes the non-volatile memory to write the swap data to the swap unit faster than writing of the normal data to the normal unit.

16. A computer system comprising:

a host; and a storage device comprising:

a non-volatile memory including a normal unit configured to store normal data associated with a normal write operation, and a swap unit configured to store swap data associated with operations other than the normal write operation; and a controller configured to control operation of the non-volatile memory to store the normal data and the swap data according to different respective data processing policies, wherein:

the controller, upon receiving from the host the swap data and a unit selection signal that selects the swap unit, processes the swap data according to a first data processing policy operationally associated with the swap unit to write the swap data to the swap unit, the first data processing policy being different than a second data processing policy operationally associated with the normal unit to write normal data to the normal unit, each of the normal unit and the swap unit is configured to be respectively provided an address space unrelated to a capacity of the non-volatile memory, the address space is configured to be used consistently, although the capacity of each of the normal unit and the swap unit is changed, the non-volatile memory includes multi-level cell flash memory cells, and the first data processing policy precludes the controller from backing up first least-significant-bit (LSB) data of the swap data after the first LSB data is written to the swap unit, the second data processing policy backs up second LSB data of the normal data after the second LSB data is written to the normal unit, and the swap data differs from the normal data in that the swap data is valid only while power is continually provided to the storage device and the swap data has not been accessed by a read operation.

17. The computer system of claim 16, wherein the host comprises:
    a central processing unit configured to process a virtual address;
    a main memory; and
    a memory management unit configured to store a mapping table that maps the virtual address to a physical address of the main memory and maps the virtual address of the swap data to a physical address of the non-volatile memory.

18. The computer system of claim 17, wherein the controller does not store a logical to physical (L2P) mapping table for the swap data.

19. The computer system of claim 16, wherein the host comprises:
    a central processing unit configured to process a virtual address;
    a main memory; and
    a memory management unit configured to store a mapping table that maps the virtual address relevant to the swap data to a logical block address and a validity table that stores validity of the virtual address relevant to the swap data.

* * * * *